F. P. JOHNSON.
TIRE FASTENING DEVICE.
APPLICATION FILED DEC. 7, 1915.

1,222,211.

Patented Apr. 10, 1917.
3 SHEETS—SHEET 1.

WITNESSES:
Howard D. Orr.
F. P. Chapman

Frank P. Johnson, INVENTOR,
BY E. G. Siggers
Attorney

F. P. JOHNSON.
TIRE FASTENING DEVICE.
APPLICATION FILED DEC. 7, 1915.

1,222,211.

Patented Apr. 10, 1917.
3 SHEETS—SHEET 2.

Frank P. Johnson, INVENTOR,

WITNESSES:

BY

Attorney

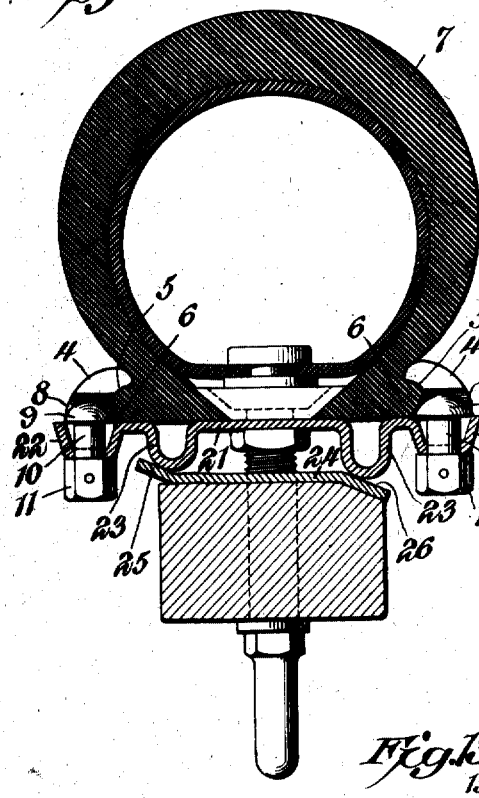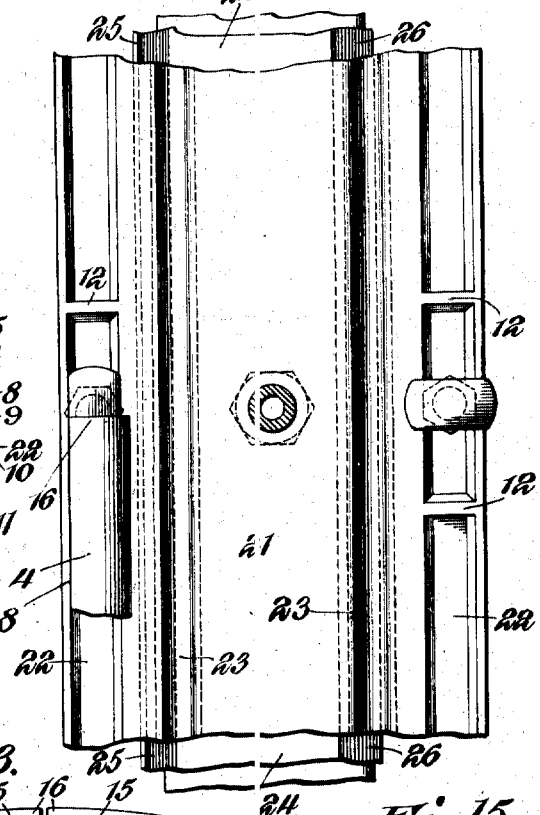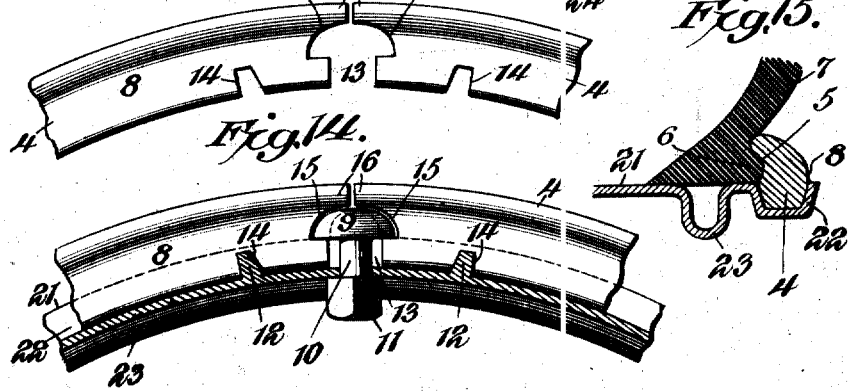

UNITED STATES PATENT OFFICE.

FRANK P. JOHNSON, OF DANVILLE, PENNSYLVANIA.

TIRE-FASTENING DEVICE.

1,222,211. Specification of Letters Patent. Patented Apr. 10, 1917.

Application filed December 7, 1915. Serial No. 65,580.

*To all whom it may concern:*

Be it known that I, FRANK P. JOHNSON, a citizen of the United States, residing at Danville, in the county of Montour and State of Pennsylvania, have invented a new and useful Tire-Fastening Device, of which the following is a specification.

This invention has reference to tire fastening devices, and its object is to provide a simple, effective, easily operated and automatically retainable locking device for a split tire-retaining ring for the rim of an automobile wheel.

It is customary to provide the rims of automobile and similar wheels with a split locking ring for retaining a pneumatic tire on the rim and yet permitting its ready removal therefrom. In some instances the split ring is utilized to directly engage the tire bead, being suitably shaped for the purpose. In other cases the tire bead is directly seated in a circumferentially continuous flange, which, however, is removable from the wheel rim and is held in place by a split locking ring. In either construction the split ring is the part which becomes effective to hold the tire upon the wheel rim and to permit its ready removal therefrom.

In accordance with the present invention a locking device is provided upon the wheel rim to engage the adjacent ends of the split ring and thereby hold it in the groove or channel customarily provided on the rim for the reception of the split ring.

The locking device of the present invention is a rotatable device provided with a stem traversing the rim at a certain point in the circumference thereof at the groove or channel, and the stem of this locking device has an elongated head at what constitutes the outer end so disposed that when turned in alinement with the ring it will simultaneously override or otherwise engage the adjacent ends of suitable locking members thereon, while the other or inner end of the stem is provided with another head preferably of polygonal shape for the reception of a suitable turning tool, such as a wrench or a pair of pliers, usually to be found in the tool kit of an automobile.

In accordance with the present invention the locking head of the locking device is, in certain forms of the invention, so situated with respect to the corresponding bead of the tire that when the head is in locking relation to the adjacent ends of the split ring, the tire bead bears against one long side of the locking head and thereby effectively holds the locking device against accidental turning from the locking position to the unlocking position, this being an automatic action without the presence, or necessity of any kind of holding device or mechanism. Such locking head is, however, so constructed that upon the application of a turning force designedly applied to the head at the inner end of the stem of the locking device, the latter may be rotated sufficiently to release the locking ring, the rotation being effected if necessary against the expansive tendency of the pneumatic tire at the bead.

Even the expansive force exerted by the outer casing on a pneumatic tire when the inner tube is deflated is sufficient to hold the locking device in the locking position by engagement of the corresponding tire bead with the locking head, so that in the event of the accidental deflation of a tire, as by a puncture or blow-out, the locking of the split ring remains reliably effective.

The manipulating head of the locking device is useful whether the ring holding or retaining head be on the outer or tire-receiving portions of the rim, or whether the split rings have lugs extending through the rim to the inner face thereof and the locking head be there located. In either instance the manipulating head is on the inner end of the stem and the stem extends radially of the rim between the adjacent ends of the split ring when in place and the ring locking device is rotatable about an axis radial to the rim.

The locking device of the present invention is in part shown and described, but is not claimed, in my prior applications Serial No. 699,965, filed May 27, 1912; Serial No. 751,375, filed Feb. 28, 1913, and renewed Dec. 17, 1913, under Serial No. 807,356; Serial No. 778,949, filed July 14, 1913, and Serial No. 10,069, filed Feb. 23, 1915, all the applications relating to tire fastening devices.

The invention will be best understood from a consideration of the following detailed description, taken in connection with the accompanying drawings forming part of this specification, with the further understanding that while the drawings show a practical form of the invention, the latter is not confined to any strict conformity with the showing of the drawings, but may be changed and modified so long as such changes and modifications come within the scope of the appended claims.

In the drawings:—

Fig. 7 is a section on the line 7—7 of Fig. 5, showing the locking device in elevation.

Fig. 8 is a plan view of the structure of Fig. 5 with the tire in section on the line 8—8.

Fig. 9 is a view similar to Fig. 7 but showing another form of locking means with the locking device in section.

Fig. 10 is a cross-section of the structure of Fig. 9 taken at the locking device and showing a tire applied.

Fig. 11 is a cross-section of another form of tire structure with a retaining ring and locking device similar to that of Fig. 1.

Fig. 12 is a plan view of the structure of Fig. 1, showing the inner tube nipple in cross-section.

Fig. 13 is a side elevation of the meeting ends of the split locking ring such as employed in Figs. 1 and 11, but viewed from the opposite side from the showing of Fig. 2.

Fig. 14 is a view similar to Fig. 2, but viewed from the opposite side.

Fig. 15 is a fragmentary section of one side of the structure of Fig. 11 taken at a point away from the locking device.

Fig. 16 is a section similar to Fig. 7, but illustrating an arrangement which may be employed with a tire-retaining ring having a rim-engaging lug at one end only.

Figure 2:
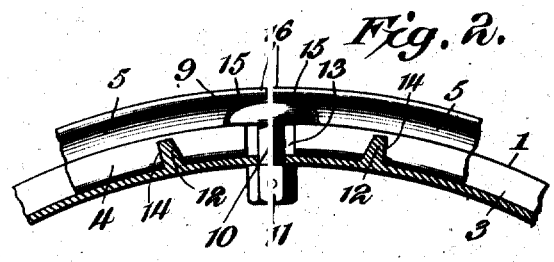
Fig. 2 is a section on the line 2—2 of Fig. 1, omitting the tire.
Figure 1:
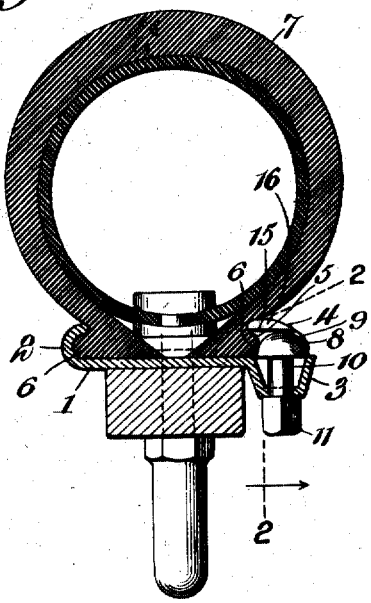
Figure 1 is a cross-section of a wheel rim at the locking device for a split ring, and also showing a cross-section of a pneumatic tire applied thereto.

Referring first to the structure shown in Fig. 1 and associated figures, a wheel rim 1 is provided with a retaining flange 2 along one edge, and with the other edge provided with a channel 3 for the reception of a split ring 4 of a width to project radially beyond the outer face of the rim 1, and there having a circumferential groove 5 suitably shaped to receive one of the beads 6 of a pneumatic tire casing 7. The groove portion 5 of the ring may be shaped in accordance with the usual custom to retain a tire casing of the form shown in the drawings, or one with straight sides, this being accomplished by providing the ring with a groove 5 on one face, while the other face 8 is properly shaped for the other type of tire.

Figure 3:
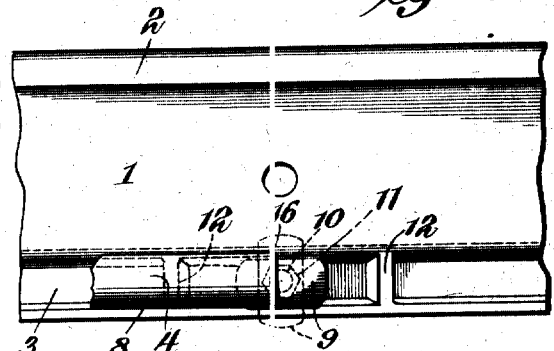
Fig. 3 is a plan view of the wheel rim at the locking device with the tire omitted and showing a portion of the split ring.

At a suitable point in the channel 3 there is located a locking button 9 on one end of a stem 10 extending through the bottom of the channel in a direction radial to the wheel rim, and on the side of the channel toward the axis of the wheel the stem 10 is provided with another head 11. The head 9 is elongated in one direction perpendicular to the longitudinal axis of the stem 10, and is of a width in a direction at right angles to the elongation of the head, so that when the head 9 has its longer axis lengthwise of the channel 3 the longer side margins of the head engage the outer face of the rim 1 at the inner edge of the channel, and also the outer face of the outer side wall of the channel, wherefore the head 9 is prevented from entering the channel at any time. The stem 10 is of such length that with the face of the head 9 toward the stem moving on the outer face of the rim 1, the head 11 engages the under face of the bottom of the channel 3, the fit being such that the locking device made up of the heads 9 and 11 and stem 10 may be easily turned about the longitudinal axis of the stem 10 without any material movement lengthwise of the stem. The structure is such that the locking device, in the absence of the tire or with it out of the path of the head 9, may be readily turned about its longitudinal axis to bring the head 9 either lengthwise of the channel 3, as shown in full lines in Fig. 3, or crosswise thereof, as shown in dotted lines in Fig. 3, but at no time is the locking device movable, to any material extent, lengthwise of its axis of rotation.

The channel 3 is provided on opposite sides of the locking device with lugs 12 rising from the bottom of the channel 3 toward the top thereof and spaced a short distance from the locking device, this distance being preferably somewhat greater than the length of the head 9, the width of the head being a little greater than the width of the channel. The split ring 4 on opposite sides of the split indicated at 13, is provided with notches 14 designed to receive the lugs 12, whereby the split ring is properly positioned in the channel 3. The adjacent ends of the split ring in the structure of Fig. 1 and associated figures have longitudinally extended entering notches or recesses 15 shaped to receive corresponding ends of the elongated head 9, when the latter is in position to extend lengthwise of the recess 3. The split ring is so constructed that that portion of the split 13 within the channel 3 is of such circumferential extent as to be somewhat greater than the width of the head 9.

The meeting ends of the split ring 4 have overhanging portions 16 exterior to the notches or recesses 15, wherefore, when the ring 4 is in place in the groove 3, the overhanging portions 16 are much closer together than the adjacent portions of the ring within the channel 3.

When the tire 7 is properly lodged on the rim 1, and the split ring 4 is properly seated in the channel 3, with the locking head 9 positioned lengthwise of the channel, so that it enters the recesses 15 and thereby holds the meeting ends of the ring in the channel with the lugs 12 within the notches 14, the inflation of the inner tube of the tire causes the beads of the tire to engage in the flange 2 on one side and the groove 5 of the split ring on the other side. The notches or recesses 15 extend laterally entirely through that portion of the split ring in which they are formed, and the width of the head 9 is such that the bead of the tire entering the groove 5 bears against the corresponding long side of the head 9, wherefore the locking device for the split ring is in turn effectively locked against turning by the tire itself, this locking of the locking device being wholly automatic and completely doing away with the necessity of any means for retaining the locking device in the locking position.

To remove the pneumatic tire from the rim it is, of course, necessary to deflate the tire, and then the split ring 4 may be released from the locking device by giving to the latter a quarter turn, so that the head 9 is positioned transversely of the channel 3 and of the wider portion of the spilt 13. The turning of the head 9 into transverse relation to the groove 3 is readily performed by the application of a wrench or a pair of pliers to the head 11, which latter is usually made hexagonal, although any other polygonal or non-circular form may be employed. In fact, the head 11 may be of any suitable shape, whereby a turning force may be applied thereto in order to move the head or button 9 from the locking position into the unlocking position.

Even after the pneumatic tire is deflated it has a tendency to retain its position in the groove 5, and so hold the head or button 9 in the locking position, wherefore should the tire become accidentally deflated because of a puncture or blow-out, it is still retained upon the rim with the locking ring locked to the rim and with the bead of the tire bearing against the head 9 with considerable pressure. This necessitates the application of considerable force to turn the locking device to the unlocking position, but such force may be readily applied by means of a wrench or a pair of pliers, such as is customarily found in the tool kit of an automobile. The head 11 could, of course, be so shaped and of appropriate size to permit its manipulation solely by the fingers of the operator, but it is preferable to shape the head 11 for the application of a tool such as forms a part of the automobile tool kit.

Figure 5:
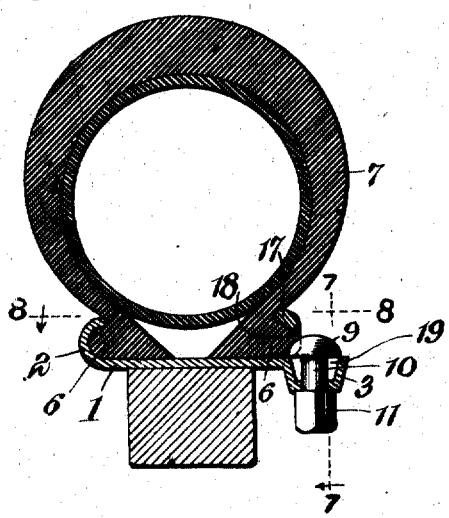
Fig. 5 is a cross-section similar to Fig. 1 but showing a construction employing a separate tire-retaining ring in addition to the split locking ring.
Figure 4:
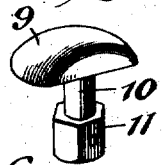
Fig. 4 is a perspective view of the locking device.
Figure 6:
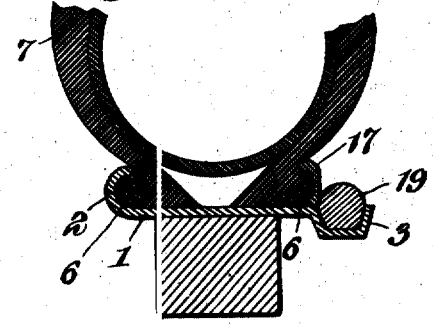
Fig. 6 is a section similar to Fig. 5, but taken to one side of the locking device.

The locking device of the present invention is as applicable to a tire-retaining structure in which both a split locking ring and a solid or circumferentially unbroken tire holding ring is employed, the tire-holding ring being in the nature of a removable flange applied to the wheel rim. In the structure of Figs. 5 and 6, the rim 1 with its inner flange 2 on one side and channel 3 on the other side, and also the locking device made up of the heads 9 and 11 and stem 10 are the same as shown and described in Fig. 1 and associated figures. In Figs. 5 and 6 there is shown a tire holding ring or removable flange 17 having a passage 18 therethrough corresponding to the notches 15 of the split ring 4, so that when the ring or flange 17 is in place, the bead 6 on the corresponding side of the casing will contact with the head 9 through the passage 18, thus holding the locking head 9 against turning when the parts are in the locking position. Instead of providing a split locking ring with an extension constituting a flange for receiving the bead of the tire, the structure of Figs. 5 to 8 is provided with a separate split locking ring 19 adapted to the channel 3, and when in the channel and held therein by the head 9 of the locking device, in turn engaging and holding the ring 17 on the rim 1. Since the split ring 19 does not directly engage the tire, the recesses 15 and overhanging portions 16 are omitted and the meeting ends of the split ring are cut back to form ledges or shoulders 20 for the reception of the locking head or button 9, which is made wide enough so that the portion of the bead of the tire exposed through the opening or passage 18 contacts with one long side of the head to hold the locking device against turning when the tire is inflated.

In the structure shown in Figs. 11 to 15 the tire carrying rim, indicated at 21, is cylindrical throughout its width, terminating at the sides in channels 22, while intermediately of the sides the rim is formed with circumferential beads 23 designed to engage a plate 24 having beveled side edges 25, 26, so that the rim may be readily removed from the wheel with the tire thereon, wherefore the rim is a demountable rim, such as shown and described in my application Serial No. 10,069, filed Feb. 23, 1915. Since the split locking ring and the locking device therefor in the showing of Figs. 11 to 15 are substantially the same as in the showing of Fig. 1 and associated figures, the same reference numerals are employed with respect thereto as are used in Figs. 1 to 4.

In the structure of Figs. 9 and 10 there is provided a split ring 27 with a groove 28 receiving the tire bead, the arrangement being similar to the structure of Fig. 1 and associated figures. The ring 27 has near its meeting ends, lugs 29 directed toward the center of the ring and adapted to pass through the bottom of the channel 3 by way of passages 30 suitably spaced apart for the purpose. Secured to the under wall of the bottom of the channel 3 intermediately of the passages 30 is a radially directed pin 31 upon which is mounted a head 32 of polygonal or other suitable contour, constituting a locking device with an elongated locking head or button 33 at one end adapted to enter notches 34 in those edges of the lugs 29 facing each other. Secured to the inner side wall of the channel 3 is a spring 35 having one end fast to the wall of the channel, and the other end returned upon itself, as indicated at 36, so as to bear against the head 32 on one of its plane faces. The lugs 29 and spring 35 with the return portion 36 are so situated that the head 32 has a free projecting portion for the application of a tool without interference from either the lugs or the spring.

While in the structure of Figs. 9 and 10 the expansion of the tire is not utilized for holding the locking device in the locking position, it has means whereby the locking device is readily moved from the locking position to the unlocking position, or the reverse, by means of one of the tools usually present in an automobile tool kit, the same as the locking devices shown in the other figures of the drawing. When the locking device of Figs. 9 and 10 is in the locking position, the spring 35 bears against one of the flat faces of the head 32 and thereby effectively holds the locking device in the locking position against accidental displacement.

The channels 3 are shown with slanting sides and a flat bottom instead of being of concave configuration, and the locking rings are shaped into conformity with the cross-sectional shape of the channel. This construction is to be preferred to the concave form of channel because the nearly square shape of the channel provides a firmer hold than a round shape, wherefore the channels need not be so deep. This permits the employment of a shallower bead, such as the beads 23 of Fig. 11 and associated figures.

While in the showing of the drawings, lugs 12 are indicated in the channels 3 and 22 and recesses 14 are provided in the corresponding split rings for receiving the lugs, it will be understood that the lugs may be produced in the split rings and extend into perforations in the bottom of the channel similar to the arrangement shown in Fig. 9, except that the lugs may be spaced farther apart and need not be of a length more than about the thickness of the bottom of the channel, the lugs in such instance simply serving as positioning and interlocking lugs. In any case the lugs may taper toward their free ends, and where the lugs enter recesses the latter may also taper in such manner that as the split ring is seated in the channel the ends are drawn toward each other.

In Fig. 16 there is shown a rim 1ᵃ which may be similar to the rim 1 of the other figures, and provided with a circumferential channel 3 to receive a tire-retaining ring 27ᵃ having a lug 29ᵃ at one end only, while in the other end of the ring there is a recess or cut-out 37 designed to receive a locking button 9 on one end of a stem 10 extending through the bottom of the channel 3 and at the other end having another head 11 similar to the locking buttons of the other constructions shown in the drawings. The cut-out 37 has a continuation 38 through the inner periphery of the locking ring 27ᵃ, so that when the button 9 is turned in one direction it will pass through the continuation 38 and when in the other direction will lock in the cut-out 37. On opposite sides of the stem 10 and suitably spaced therefrom the rim 1ᵃ has passages 39 through the bottom of the channel 3, these passages being so shaped as to be traversed by the lug 29ᵃ for the latter to lock to the rim, the other end of the ring 27ᵃ being held to the rim by the button 9. Two passages 39 are needed when it is desired to reverse the ring 27ᵃ.

In all forms of the invention, except Figs. 9 and 10, it will be noted that the locking head of the button when in its locked position intersects the tire seat and bears against the bead of the outer casing. To unlock the tire-retaining ring, the button must be turned to a transverse position. It would be impossible for it to turn with the tire bearing against the side of the button, and this is particularly true when the inner tube is inflated.

What is claimed is:—

1. In a tire fastening device, a rim, a tire-retaining ring detachably mounted on the rim and interlocking therewith, and a locking device for the ring having a locking portion movable from a position in line with the ring to a position transverse thereto, said locking portion when in the first-mentioned position being disposed in such close relation to the outer casing of the tire that it is held solely by the latter from moving to the second position.

2. In a tire fastening device, a rim, a tire-retaining ring detachably mounted on the rim and interlocking therewith, and a locking device for the ring having a locking head of greater length than width, said locking device being rotatable on an axis substantially radial to the rim and provided with parts coacting with the head and rim to hold the locking device against movement lengthwise of its axis of rotation, and said head having the face toward the rim movable over the latter in close relation thereto with one long side of the head engaged by the outer casing of the tire when the head is in ring-locking position, whereby the head is maintained in said ring-locking position solely by the outer casing of the tire.

3. In a tire fastening device, a rim, a recessed tire-retaining ring detachably mounted on the rim and interlocking therewith, and a locking device for the ring having a locking portion movable in the recessed part of the ring from a position in line with the ring to a position transverse thereto, said locking portion when in the first-mentioned position serving to lock the ring to the rim and then disposed in such close relation to the outer casing of the tire that it is held solely by the latter from moving to the second position.

4. In a tire fastening device, a rim, a tire-retaining ring detachably mounted on the rim and interlocking therewith, and a locking device revolubly mounted on the rim to rotate around an axis which is radial to the rim, said locking device being at all times held against movement lengthwise of its axis of rotation and having a locking head which is carried by the rotary movement thereof into and out engagement with the tire-retaining ring, and in the locked position intersects the tire seat of the ring and bears against the outer casing so as to be held solely thereby from turning.

5. In a tire fastening device, a rim, a tire-retaining ring detachably mounted on the rim and interlocking therewith, a locking device revolubly mounted on the rim to rotate around an axis which is radial to the rim, said locking device being at all times held against movement lengthwise of its axis of rotation, and having a locking portion carried by the rotary movement thereof into and out of locking engagement with the tire-retaining ring, and said locking portion having a range of rotative movement of substantially 90° from the locked to the unlocked position and when in its normal locked position being arranged in juxtaposition to the outer casing of the tire so as to be held solely thereby from turning.

6. In a tire fastening device, a rim, a split tire-retaining ring detachably mounted on the rim and interlocking therewith, and a locking device revolubly mounted on the rim to rotate on a radial axis extending between the ends of the ring, said locking device having a locking head carried by substantially a quarter turn into and out of engagement with the tire-retaining ring, and when in locked position being in direct engagement with the bead of the outer casing, whereby the outer casing of the tire constitutes the sole means for holding the locking device in the locking position.

7. In a tire fastening device, a rim, a tire-retaining ring detachably mounted on the rim, and a locking device for the ring mounted on the rim to rotate about an axis radial to the rim and at all times held against movement lengthwise of its axis of rotation, said locking device having a head with a substantially flat face toward the rim and movable over the latter in close relation thereto, said head having a side portion in position to be engaged by the outer casing of the tire when the head is in the locking position, whereby the outer casing constitutes the sole means for holding the head in the locking position.

8. In a tire fastening device, a rim, a tire retaining ring detachably mounted on the rim, and a locking device for the tire-retaining ring mounted on and at all times held against movement radially of the rim and also revoluble on an axis substantially radial to the rim, said locking device being provided with a head longer than wide and having a substantially flat face presented toward the rim to move over the outer face of the latter in close relation thereto, said head being movable from a position in line with the ring to a position transversely thereof, and when in line with the ring having one long side in position to be engaged by the tire held by the ring, whereby the tire constitutes the sole means for holding the ring-locking device in the locking position.

9. In a tire fastening device, a rim, a split tire-retaining ring detachably mounted on the rim and interlocking therewith, a locking device mounted on the rim to rotate around a radial axis which extends between the ends of the ring, said locking device being at all times held against movement lengthwise of its axis of rotation and freely revoluble on said axis in the absence of the tire and also having a locking head carried by the rotary movement thereof into and out of locking engagement with the tire-retaining ring, said ring having recesses in which the head of the locking device is rotatable, and said head being exposed at the inner side of the ring to intersect the seat of the tire, so as to contact with the outer casing thereof and be held solely thereby from accidental turning.

10. In a tire fastening device, a rim having a circumferential channel, spaced lugs provided in the channel, a split tire-retaining ring having notches near its meeting ends to receive said lugs, a locking device revolubly mounted on the rim to rotate around a radial axis which extends between the ends of the ring, said locking device having a locking head carried by the rotary movement thereof into and out of locking engagement with the tire-retaining ring, and said head intersecting the tire seat of the ring and adapted to bear at its inner side against the outer casing so as to be held solely thereby from accidental turning.

11. A device of the class described, comprising a rim with a circumferential channel, a split tire-retaining ring with recesses at the meeting ends and mounted in the channel, lugs on one part fitted in notches of the other part, and a locking device comprising a stem extending through the bottom of the channel radially of the rim and an elongated head rotatable in the recesses of the ring and of a length to engage and lock the meeting ends of the ring when alined therewith and of a width to pass between the ends of the ring when transverse thereof, said head being at all times held against movement lengthwise of its axis of rotation and when in its locking position being disposed in such close relation to the tire fitting against the ring as to be held solely thereby from rotative movement.

12. In a tire fastening device provided with a split tire-retaining ring, a locking device for holding the split ring in place comprising a turn button having a head adapted to overlap and engage the meeting ends of the ring and having the end remote from the head non-circular in shape to receive a wrench or the like for turning the locking device into and out of locking engagement with the split ring.

13. In a device of the class described, a rim, a split tire-retaining ring detachably mounted on and interlocking with the rim, and a locking device carried by the wheel rim, said locking device having a stem radial to the rim and about the longitudinal axis of which stem the locking device is rotatable, said locking device also having a locking head elongated transversely to the axis of rotation to engage and hold said ring when in one position, and to release said ring when in another position, and a manipulating head exposed on the side of the wheel rim toward the axis of the wheel and non-circular in shape to receive a wrench or the like for the application of turning forces to said locking device.

14. A device of the class described, comprising a rim, a split-tire-retaining ring detachably mounted on and interlocking with the rim, and a locking device rotatably mounted on the rim with its axis of rotation radial to the rim and extending between the meeting ends of the ring, said locking device having at one end a locking head movable by rotation of said locking device into and out of locking engagement with the meeting ends of the split tire-engaging ring, and at the other end having a polygonal head for the application of a manipulating tool.

15. A device of the class described, comprising a rim, a split tire-retaining ring detachably mounted on and interlocking with the rim, and a locking device rotatably mounted on the rim with its axis of rotation radial to the rim and extending between the ends of the ring, said locking device comprising a stem, a head at one end of the stem elongated perpendicular to the length of the stem to engage and lock the meeting ends of the ring and of a width to pass between the meeting ends of the ring, and another head at the other end of the stem and there freely accessible, said head being of polygonal cross-section and free to receive a manipulating tool for rotating the locking device.

In testimony that I claim the foregoing as my own, I have hereto affixed my signature in the presence of two witnesses.

FRANK P. JOHNSON.

Witnesses:
G. SHOOP HUNT,
F. W. MAGILL.